April 10, 1934. W. J. DE REAMER 1,954,586
PAD FOR FRAGILE ARTICLES
Filed Dec. 19, 1932
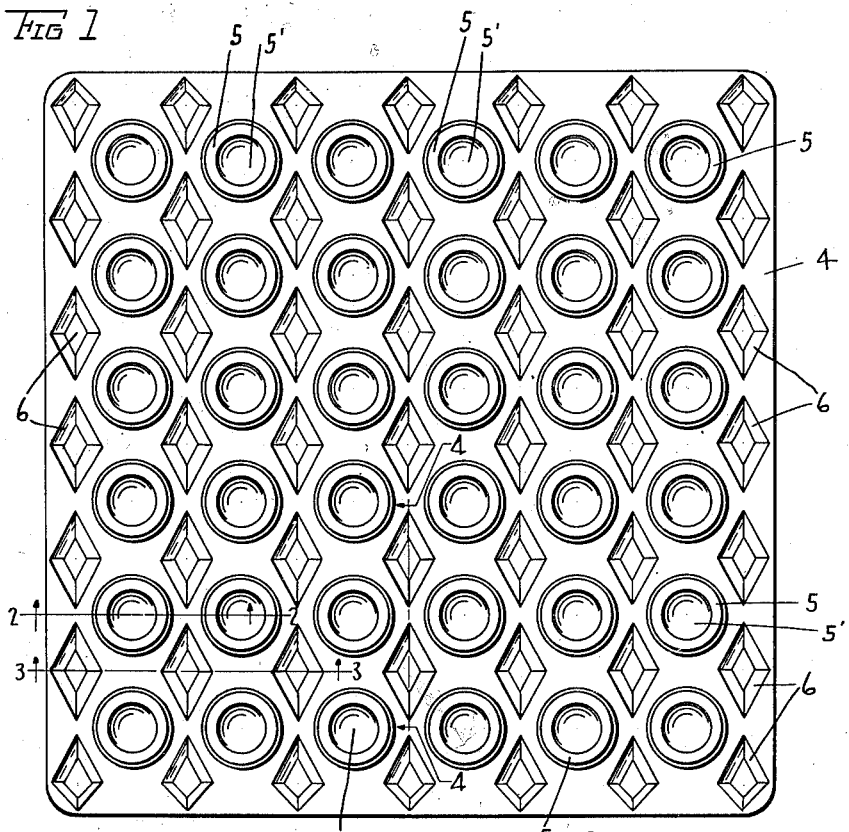
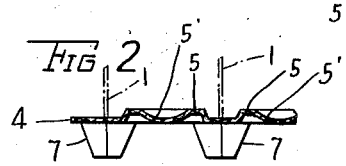
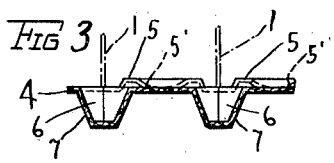
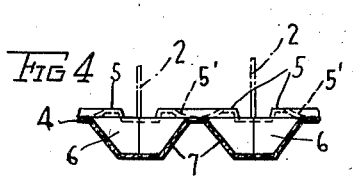
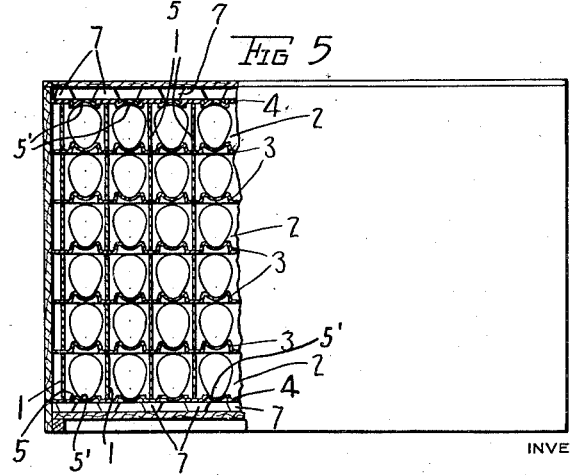
INVENTOR
William J. De Reamer
BY Staley & Welch
ATTORNEYS Patented Apr. 10, 1934

1,954,586

UNITED STATES PATENT OFFICE 1,954,586

PAD FOR FRAGILE ARTICLES

William J. De Reamer, Crown Point, Ind., assignor to Mapes Consolidated Manufacturing Company, Griffith, Ind., a corporation of Delaware Application December 19, 1932, Serial No. 647,889

6 Claims. (Cl. 217—27)

This invention relates to pads for protecting fragile articles, it more particularly relating to a pad which can be placed at the top and bottom of an egg shipping case to protect the eggs, although the utility of the pad is not necessarily confined to that particular use.

An object of the invention is to provide a pad which will be simple in construction, economical in manufacture and effective in use.

A further object of the invention is to provide a pad for use in an egg shipping case which will not only effectively protect the eggs at the bottom and top of the case but may also be used to displace the top and bottom flats which are commonly used to separate the egg cells or fillers used in the shipment of eggs.

A further object of the invention insofar as applicable to the shipment of eggs is to provide a pad so constructed that it will not only effectively protect the eggs but will also act as a reservoir to receive the embryo of broken eggs or eggs which leak and provide a support for the unbroken eggs such as will prevent them from coming in contact with the embryo which has become deposited in the reservoirs.

Other objects of the invention will appear from the accompanying description.

In the accompanying drawing:

Fig. 1 is a top plan view of a pad embodying the improvements.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a view partly in front elevation and partly in vertical section of an egg shipping case and its fillers showing the improved pad in position thereon.

In a shipment of eggs it is usual to provide cells for the eggs formed by intersecting and interlocked cross-strips of strawboard or other suitable material, such as shown at 1 and 2 in Fig. 5. Each series of cells so formed is separated by a "flat", it being usual to also place one of these flats at the bottom and top of the case. In the present instance adjacent series of cells are shown separated by a flat of a well known construction, indicated at 3, such a flat being shown and described in the patent to Koppelman and Cooper No. 1,429,207, dated September 12th, 1922. Instead of placing one of these flats at the extreme bottom and top of the case, however, as has been the custom, I employ at these points the improved pad now to be described.

The pad is molded from paper pulp in a well known way and consists of a flat portion 4 formed on its upper side with a series of parallel rows of round, hollow bosses 5 having a comparatively shallow semicircular depression 5; and a series of parallel rows of recesses 6, the walls of the recesses projecting from the lower side of the flat portion of the pad in the form of hollow projections 7. These projections are tapered and of such shape and depth as to prevent the use of the pad as a flat between cellular fillers.

The bosses 5 are equal in number to any series of cells formed by the cross-strips 1 and 2 and are so disposed on the pad that each will ocupy a position centrally of a cell as to the width and breadth thereof. The recesses are so disposed that they will be in spaced staggered relation with the bosses and further so disposed that when the cross-strips are positioned thereon the centers of the recesses will coincide substantially with points of intersection of the cross-strips but the walls of said recesses defining projections 7 will be out of contact therewith so that a portion of each recess will be within the area occupied by a cell whereby each cell will be in communication with four of the recesses.

The bosses 5 function in two ways: First, circular walls are provided elevated above the flat portion 4 of the pad to receive the lower ends of the eggs of the lower tier so that the embryo of any broken or leaking eggs will be kept from coming in contact with the eggs; second, these bosses act as spacers for maintaining the adjacent cross-strips forming the cells in position by preventing them from unduly moving in a lateral direction. The hollow studs 7 not only act as reservoirs to receive the embryo of broken or leaking eggs but also act as cushions to protect the eggs during shipment. In practice, these pads 4 will be used both at the bottom and at the top of the egg case as shown in Fig. 5, the pad at the top being inverted as shown.

As illustrated, the flat portions of the pad are disposed on all sides of the bosses and projections, and serve as contact surfaces for the vertical edges of the filler 1 whch they support. Through this arrangement, the bosses are afforded a slight yielding under pressure. It is also noteworthy that the projections 7 are spaced from and therefore out of contact with the filler 1. A more pronounced cushion effect is therefore obtained since the projections directly engage the wall of the egg crate. This arrangement, affords a yieldability to all rows of eggs as a unit, as well as to the uppermost and lowermost tiers, individually. These outermost tiers are therefore assured of suspension above and

Having thus described my invention, I claim:

1. A combined flat and pad adapted to have one side contiguous to the wall of a shipping case and the opposite side facing the cellular filler, and producing the end closure therefor, consisting of a sheet of flat, thin yielding fibrous material having upstanding hollow egg-receiving bosses with cup-like depressions therein for receiving eggs protruding on one side of the flat portions of the sheet and having spaced hollow outwardly tapering supporting projections for the sheet on the opposite side of the flat portions thereof, said projections arranged in rows running in one direction of the sheet only and said bosses and projections being arranged in spaced staggered relation to one another so that there are flat portions of the sheet between the projections and between the bosses in the respective lines of their arrangement, said pad being engageable by the cellular filler only along said flat portions, the projections being spaced from the cellular filler so as to be out of contact therewith and in contact with the wall of the case, the outer extremities of said projections being of relatively small length and diameter, whereby the weight of the sheet and the articles supported thereby is sustained by relatively small surfaces against the walls of an outer case.

2. A lining pad for egg crates having cellular fillers consisting of a sheet of flat thin yielding fibrous material having parallel rows of upstanding hollow egg-receiving bosses with imperforate cup-like depressions therein for receiving eggs on one side of the flat portions of the sheet and having parallel rows of spaced hollow outwardly tapering supporting projections for the sheet on the opposite side of the flat portions thereof, said rows of bosses and projections being alternately arranged with the projections in spaced staggered relation with said bosses so that each boss will be surrounded by a flat portion of the sheet to permit slight yielding of the bosses under vertical pressure, said bosses, projections and intervening flat portions being arranged in spaced relation so that the flat portions only engage the cellular filler.

3. A crate-engaging, egg-engaging and filler-engaging pad for egg crates having cellular fillers consisting of a sheet of flat thin yielding fibrous material having parallel rows of hollow egg-receiving bosses with imperforate cup-like depressions therein for receiving eggs on one side of the flat portions of the sheet and having parallel rows of hollow outwardly tapering supporting projections for the sheet on the opposite side of the flat portions thereof, said rows of bosses and projections being alternately arranged with the projections in spaced staggered relation with said bosses so that each boss will be surrounded by a flat portion of the sheet to permit slight yielding of the bosses under vertical pressure, said projections being spaced from a superposed filler so as to be positioned out of contact with and extending away from the vertical walls of such filler.

4. In an egg crate, the combination with a cellular filler, of a crate-engaging, filler-engaging and egg-engaging pad consisting of a sheet of flat thin yielding fibrous material having hollow bosses on one side of the flat portions thereof with cup-shaped imperforate egg-receiving depressions therein and having hollow outwardly tapering supporting projections on the opposite side of the flat portions thereof, the outer extremities of said tapering projections being of relatively small area, said projections being of considerable greater depth than the height of said bosses, said bosses and projections being arranged in alternate rows with the projections in spaced staggered relation with said bosses so that each boss will be surrounded by a flat portion of the sheet to permit slight yielding of the bosses under vertical pressure, said bosses being aligned with the cells of the filler for engaging the eggs, said projections being spaced from the bosses and filler for engaging the crate.

5. A lining pad for engaging the top or bottom wall of an egg case provided with a cellular filler or the like comprising a combined one piece flat and pad consisting of a sheet of thin yielding fibrous material having parallel rows of spaced hollow upstanding egg receiving bosses protruding beyond one face of the sheet and having parallel rows of hollow projections protruding beyond the opposite face of the sheet, all of said rows being parallel to one another and alternately disposed with the bosses of each row staggered with respect to the projections of adjacent rows, said projections extending away from the filler and having their extremities engaging the wall of the case with the boss-carrying face disposed inwardly toward and engaging the filler.

6. In an egg crate having alternate tiers of egg flats and cellular fillers, a combined one piece lining pad and flat for the outermost layer of eggs comprising a sheet of thin yielding fibrous material having a plurality of upstanding egg receiving bosses protruding beyond one face of the sheet and having a plurality of spaced hollow projections protruding beyond the opposite face of the sheet, each of said projections having tapered walls merging into an imperforate end engaging the wall of the crate, said imperforate end being spaced from and out of contact with the cellular filler.

WILLIAM J. DE REAMER.